United States Patent [19]
Kesinger

[11] Patent Number: 5,704,626
[45] Date of Patent: Jan. 6, 1998

[54] SUSPENSION DEVICE FOR REDUCING TRANSMISSION OF SHOCK THROUGH BICYCLE COMPONENTS

[76] Inventor: Donald A. Kesinger, P.O. Box 396, Morrison, Colo. 80465

[21] Appl. No.: 523,724

[22] Filed: Sep. 5, 1995

[51] Int. Cl.[6] .................................................. B62J 1/06
[52] U.S. Cl. .......................... 280/220; 267/132; 267/292; 280/275; 280/283; 297/215.15
[58] Field of Search .................................. 280/220, 275, 280/276, 283, 284, 277, 286, 281.1, 290; 297/313, 199, 200, 215.13, 215.14, 215.15, 195.1; 267/131, 132, 153, 64.26, 292, 293

[56] References Cited

U.S. PATENT DOCUMENTS

| | | |
|---|---|---|
| 575,152 | 1/1897 | Fogg . |
| 600,365 | 3/1898 | Hindmarsh . |
| 601,978 | 4/1898 | Nevill . |
| 602,354 | 4/1898 | Ohlgart . |
| 636,726 | 11/1899 | Hindmarsh . |
| 640,483 | 1/1900 | McKenzie ........................... 280/283 |
| 658,909 | 10/1900 | Fraser . |
| 979,483 | 12/1910 | Harley . |
| 1,605,798 | 11/1926 | Crombrugge . |
| 2,982,536 | 5/1961 | Kordes ............................... 267/292 |
| 3,912,054 | 10/1975 | Fabre et al. ....................... 188/282 |
| 3,944,198 | 3/1976 | Sakamoto ......................... 207/64.26 |
| 3,982,770 | 9/1976 | Satoh et al. ...................... 280/284 |
| 3,989,263 | 11/1976 | Stuck et al. ...................... 280/283 |
| 4,182,508 | 1/1980 | Kallai et al. ...................... 267/132 |
| 4,275,922 | 6/1981 | Juy ................................... 297/215.14 |
| 4,421,357 | 12/1983 | Shimano .......................... 297/215.14 |
| 4,576,393 | 3/1986 | Moulton et al. ................. 280/276 |
| 4,997,232 | 3/1991 | Johnsen ........................... 297/209 |
| 5,044,648 | 9/1991 | Knapp .............................. 280/283 |
| 5,094,424 | 3/1992 | Hartway .......................... 248/600 |
| 5,269,549 | 12/1993 | Wilson et al. .................... 280/276 |

(List continued on next page.)

FOREIGN PATENT DOCUMENTS

| | | | |
|---|---|---|---|
| 6853 | 1/1907 | France .................................. 280/283 |
| 2511289 | 9/1975 | Germany ............................. 267/64.26 |
| 3936342 | 5/1991 | Germany ............................. 280/220 |
| 0610862 | 10/1960 | Italy ..................................... 297/215.15 |
| 2-38196 | 2/1990 | Japan . |
| WO9015748 | 12/1990 | WIPO ................................... 280/220 |

OTHER PUBLICATIONS

"Suspension Seatpost Shootout" Apr. 1995, Mountain Bike Action Magazine pp. 98–101, 106, 108.

"Answer Manitou EFC Suspension Fork", Apr. 1995, Mountain Bike Action Magazine, pp. 46 & 47.

"American Classic Titanium Seatpost", Spring 1995, Mountain Bike Action Accessory Guide, p. 70.

Primary Examiner—Anne Marie Boehler
Attorney, Agent, or Firm—Flanagan & Flanagan

[57] ABSTRACT

A shock vibration transmission reducing suspension device includes an outer tube for mounting to a bicycle frame, a lower guide element having a rectangular bore and stationarily secured in the outer tube between and spaced from an open top end and closed bottom end thereof, an upper guide element having a circular opening and fixedly secured in the outer tube adjacent to its open top end, an inner shaft disposed within the outer tube and extending upwardly through the open top end thereof to support a bicycle seat mounting assembly above the bicycle frame and being received through the lower and upper guide elements such that the inner shaft is disposed and guided to undergo sliding movement axially along the outer tube such that an upper portion of the inner shaft can progressively extend from and retract into the open top end of the outer tube, and a stack of resiliently compressible elastomeric elements disposed in the outer tube below a lower end of the inner shaft so as to support the inner shaft and absorb a shock imparted to the outer tube by permitting the inner shaft to slidably move further into the outer tube toward a depressed position while causing the inner shaft to slidably move out of the outer tube toward an extended position upon cessation of the shock.

30 Claims, 4 Drawing Sheets

U.S. PATENT DOCUMENTS

| | | | |
|---|---|---|---|
| 5,284,352 | 2/1994 | Chen | 280/276 |
| 5,310,203 | 5/1994 | Chen | 280/276 |
| 5,316,259 | 5/1994 | Pawlykowych et al. | 267/132 |
| 5,324,058 | 6/1994 | Massaro | 280/283 |
| 5,344,170 | 9/1994 | Ochoa | 280/283 |
| 5,370,351 | 12/1994 | Chen | 248/600 |
| 5,382,039 | 1/1995 | Hawker | 280/283 |
| 5,449,155 | 9/1995 | Mack | 267/153 |
| 5,511,811 | 4/1996 | Pileggi | 280/276 |

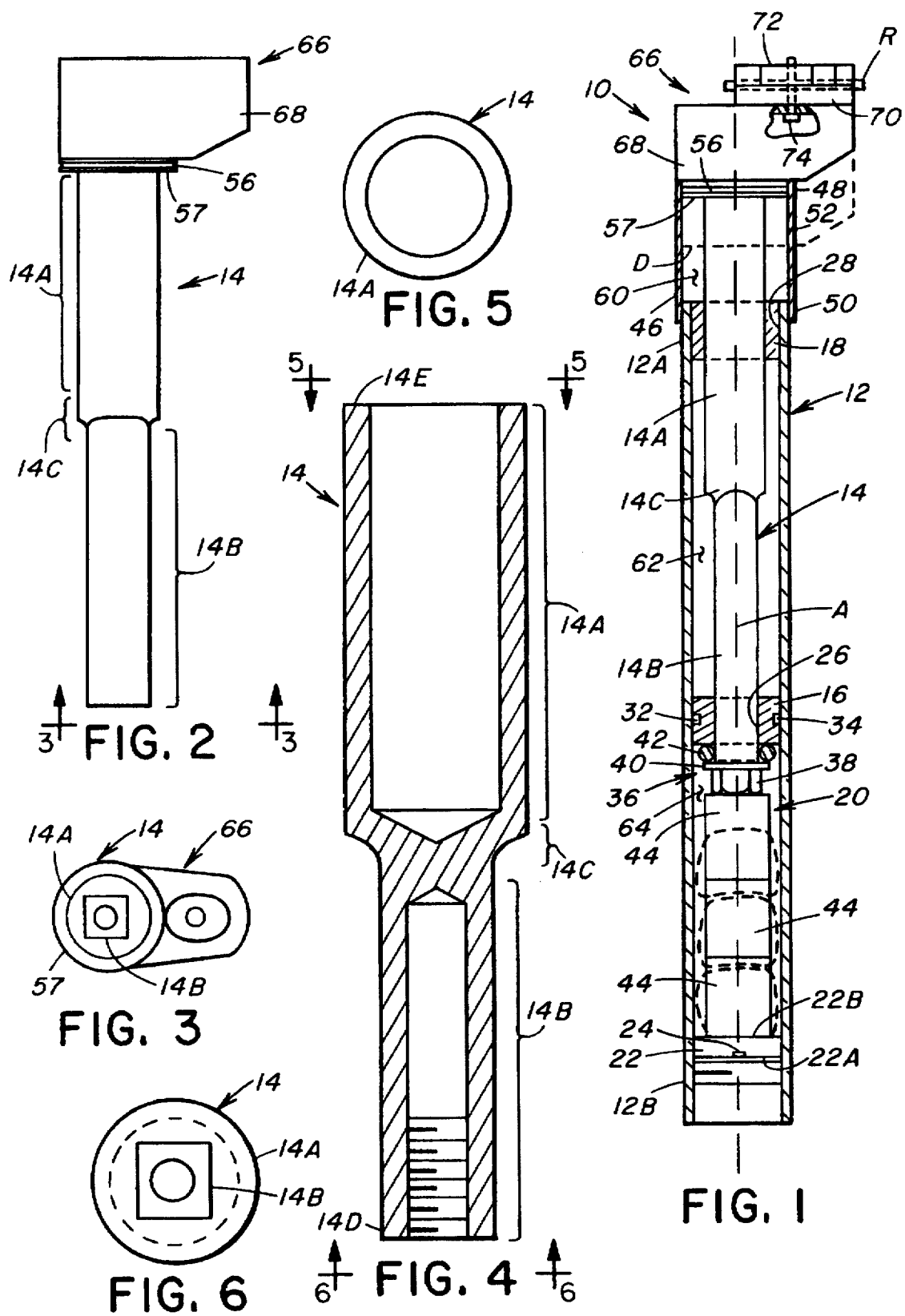

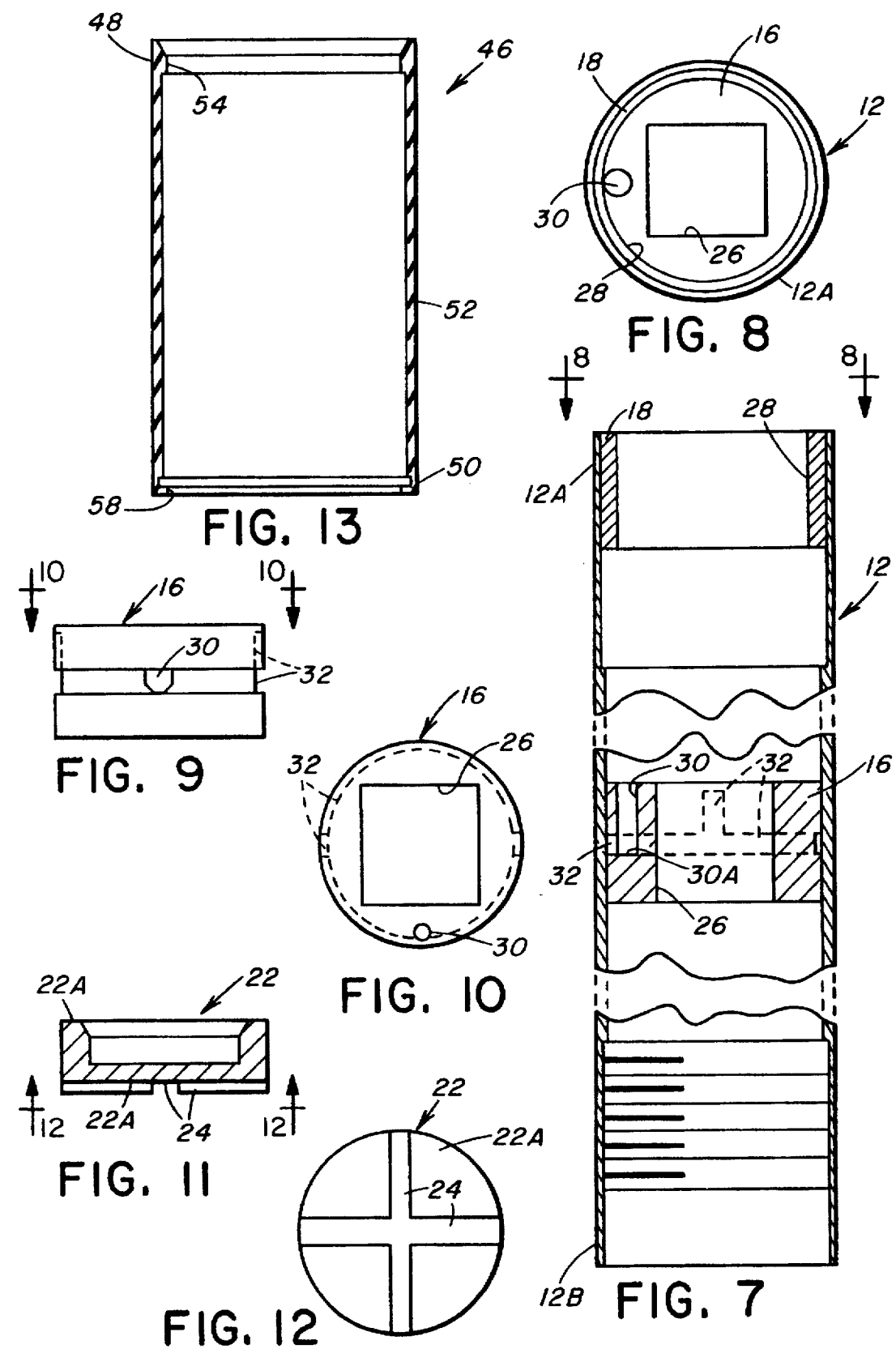

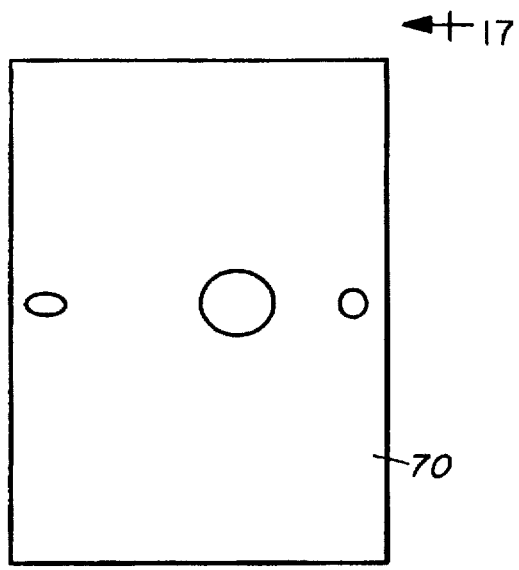
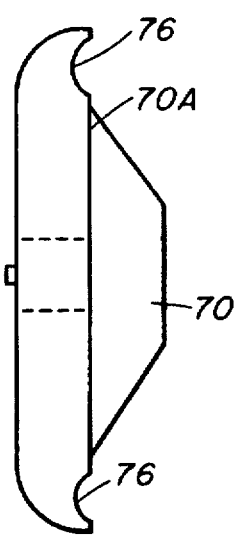
FIG. 16   FIG. 17
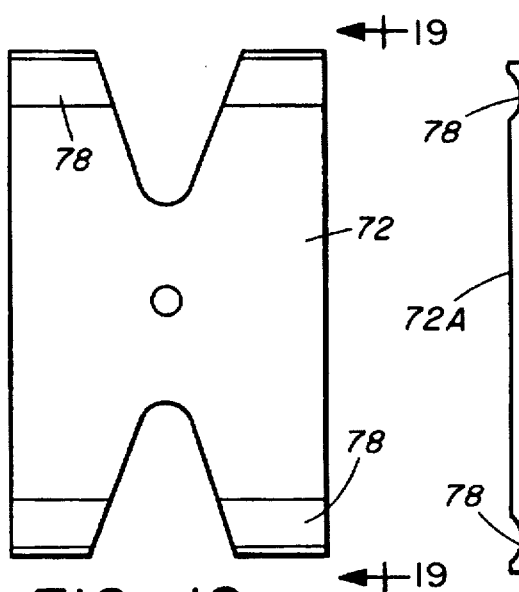
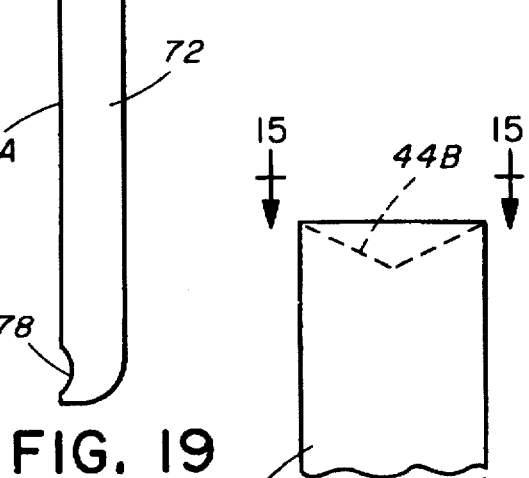
FIG. 18   FIG. 19
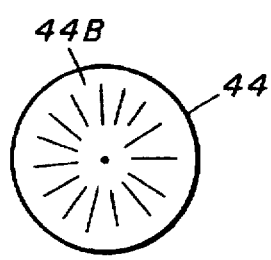
FIG. 15
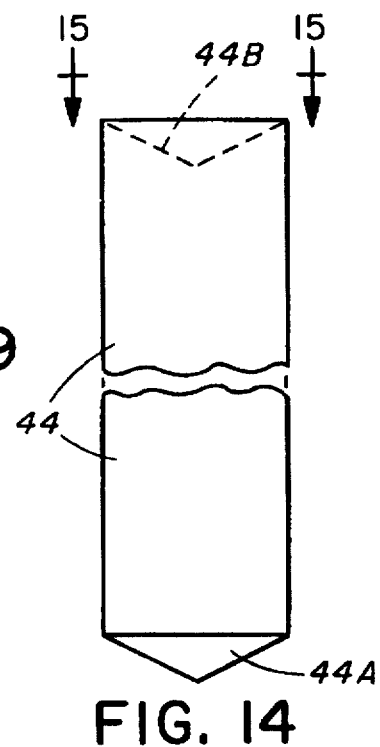
FIG. 14

SUSPENSION DEVICE FOR REDUCING TRANSMISSION OF SHOCK THROUGH BICYCLE COMPONENTS

BACKGROUND OF THE INVENTION

1. Field of the Invention

The present invention generally relates to shock absorbing devices and, more particularly, is concerned with a suspension device for mounting on a bicycle for absorbing and reducing transmission of shock through components of the bicycle to the cyclist.

2. Description of the Prior Art

Various designs of seat post suspension devices have been proposed over the years for the purpose of reducing transmission of shock impacts and vibrations to a cyclist and thereby increasing riding comfort and performance. The rising popularity of mountain biking, involving riding over rough terrain which causes jolts to the spine of the cyclist, has heightened interest in the continued development and refinement of suspension devices.

Representative examples of prior art seat post suspension devices are disclosed in U.S. Pat. No. 3,989,263 to Stuck, U.S. Pat. No. 4,182,508 to Kallai et al, U.S. Pat. No. 5,044,648 to Knapp, U.S. Pat. No. 5,094,424 to Hartway, U.S. Pat. No. 5,324,058 to Massaro, U.S. Pat. No. 5,344,170 to Ochoa, U.S. Pat. No. 5,370,351 to Chen, U.S. Pat. No. 5,382,039 to Hawker, and German Pat. Doc. No. DE 3936-342-A1 to Griesel. Other seat post suspension devices are disclosed in an article entitled "Suspension Seatpost Shoot-out" published in an April 1995 issue of Mountain Bike Action magazine. Most prior art devices are designed to reduce transmission of shock and thereby enhance cyclist comfort and performance in all modes of cycling. Existing bicycle seat post offers a convenient and accessible location on a bicycle for installation of such suspension devices. However, many suspension devices introduce drawbacks in that they are complicated assemblies and unduly increase the overall weight of the bicycle seat post.

Consequently, a need still exists for improvements in the design of bicycle suspension devices which will eliminate the drawbacks associated with the prior art devices without substituting new drawbacks therefor.

SUMMARY OF THE INVENTION

The present invention provides a shock transmission reducing suspension device designed to satisfy the aforementioned needs. The suspension device of the present invention can be applied between various components of a bicycle, such as its frame, seat post and handlebars, to reduce transmission of shock to the cyclist. The preferred embodiment of the suspension device disclosed herein is particularly suitable for incorporation in a bicycle seat post for reducing transmission of shock from the bicycle wheels through the frame to the cyclist on the bicycle seat. It should be understood, however, that it is within the purview of the present invention that the suspension device can be applied to various components of bicycles and also that the device is not limited solely to use on bicycles but is useful on cycles of all types although the word "bicycle" will be used herein for the sake of brevity.

Accordingly, the present invention is directed to a a suspension device for reducing shock transmission, such as through bicycle components. The suspension device comprises: (a) an elongated outer tube; (b) a lower guide element having a bore defined therethrough and being stationarily secured in the outer tube between and spaced from an open top end and a bottom end thereof; (c) an upper guide element having an opening defined therethrough and being stationarily secured in the outer tube adjacent to its open top end; (d) an inner shaft disposed within the outer tube and extending upwardly through the open top end thereof and having an upper portion received through the opening of the upper guide element and a lower portion received through the bore of the lower guide element so as to guide the inner shaft to undergo sliding movement axially along the outer tube and thereby extend from and retract into the open top end of the outer tube between extended and depressed positions; and (e) shock absorbing means in the form of elastomeric elements arranged in an end-to-end stacked relationship and disposed in the outer tube between its bottom end and a lower end of the inner shaft. Preferably, the bore through the lower guide element is polygonal in shape and the opening through the upper guide element is circular in shape. Also, the upper portion of the inner shaft is circular in cross-section while the lower portion of the inner shaft is polygonal in cross-section such that while the inner shaft can undergo longitudinal axial sliding movement, it is restrained from undergoing rotational movement relative to the lower and upper guide elements and thus the outer tube.

More particularly, the elastomeric elements are made of a resiliently compressible material adapted to compress in axial length and absorb a shock imparted thereto. The compression of and absorption of the shock by the elastomeric elements reduces transmission of the shock to the inner shaft. Also, compression of the elastomeric elements permits the inner shaft which supports a load intended to be isolated from the shock to slidably move further into the outer tube toward the depressed position and conversely upon cessation of application of the shock to expand back in axial length and thereby cause the inner shaft to slidably move and extend from the outer tube toward the extended position.

Further, the suspension device includes a flexible tubular protective cover sleeve surrounding and sealably engaged with respective upper ends of the inner shaft and outer tube and extending therebetween so as to prevent foreign matter from accumulating on the upper portion of the inner shaft extending from the upper end of the outer tube. The flexible cover sleeve also forms an external annular chamber containing a gas which compresses upon retraction of the inner shaft from its extended to depressed position into the outer tube and thus dampens and reduces the rate of retraction of the inner shaft.

Still further, an upper internal annular chamber is formed in the outer tube between the inner shaft and the outer tube and extending between the upper and lower guide elements. The upper internal annular chamber also contains a gas which, upon retraction of the upper portion of the inner shaft into the outer tube, becomes compressed and provides a damping effect that reduces the rate of retraction of the inner shaft into the outer tube and thereby augments the absorption of shock by the stack of elastomeric elements.

Additionally, a lower internal annular chamber is formed between the outside of the stack of elastomeric elements and inside of the outer tube below the lower guide element. The lower internal annular chamber also contains a gas which, upon retraction of the inner shaft further into the outer tube, becomes compressed and provides a damping effect that reduces the rate of retraction of the inner shaft into the outer tube and thereby augments the absorption of shock by the stack of elastomeric elements.

Further, the lower guide element has a hole defined therein offset from the opening which receives the inner shaft. The lower guide element also has a peripheral groove defined about the circumference thereof which intersects with the hole and provides a pathway for filling the peripheral groove with an adhesive substance after the lower guide element is installed at the desired stationary location in the outer tube. The adhesive substance filling the groove provides a continuous circumferential bond attaching the lower guide element about the periphery thereof to the inside surface of the outer tube.

The present invention is also directed to a seat mounting assembly which includes a base member attached on the upper end of the inner shaft, a pivotal lower clamp member pivotally hinged to the base member, and an upper clamp member fastening support rails of the bicycle seat upon the pivotal lower clamp member. The support rails and thus the seat therewith can be moved in a fore and aft direction and in an angular direction in order to adjust the location and angular orientation of the seat relative to the seat mounting assembly.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a side elevational view partly in section of a shock reducing suspension device of the present invention for a bicycle seat post.

FIG. 2 is an enlarged side elevational view of inner shaft of the suspension device of FIG. 1 showing a first embodiment of a seat mounting assembly on an upper end of the inner shaft.

FIG. 3 is a bottom plan view of the inner shaft as seen along line 3—3 of FIG. 2.

FIG. 4 is an enlarged longitudinal sectional view of the inner shaft of FIG. 3.

FIG. 5 is a top plan view of the inner shaft as seen along line 5—5 of FIG. 4.

FIG. 6 is a bottom plan view of the inner shaft as seen along line 6—6 of FIG. 4.

FIG. 7 is an enlarged longitudinal sectional view of an outer tube and upper and lower guide elements of the suspension device of FIG. 1.

FIG. 8 is a top plan view of the outer tube and the upper and lower guide elements as seen along line 8—8 of FIG. 7.

FIG. 9 is an enlarged side elevational view of the lower guide element shown removed from the outer tube.

FIG. 10 is a top plan view of the lower guide element as seen along line 10—10 of FIG. 9.

FIG. 11 is an enlarged side elevational view of a bottom end cap of the suspension device shown removed from the outer tube.

FIG. 12 is a bottom plan view of the bottom end cap as seen along line 12—12 of FIG. 11.

FIG. 13 is an enlarged longitudinal sectional view of a flexible tubular protective cover sleeve of the suspension device of FIG. 1 shown removed from around upper ends of the inner shaft and outer tube.

FIG. 14 is an enlarged side elevational view of one of a plurality of resiliently compressible elastomeric elements of the suspension device of FIG. 1 shown removed from an end-to-end stacked relationship within the outer tube and captured between the bottom end cap and a lower end of the inner tube.

FIG. 15 is a top plan view of the elastomeric element as seen along line 15—15 of FIG. 14.

FIG. 16 is an enlarged bottom plan view of a lower clamp member of the first embodiment of the seat mounting assembly removed from the upper end of the inner tube of the suspension device of FIG. 1.

FIG. 17 is a side elevational view of the lower clamp member of the seat mounting assembly as seen along line 17—17 of FIG. 16.

FIG. 18 is an enlarged bottom plan view of an upper clamp member of the first embodiment of the seat mounting assembly removed from above the lower clamp member thereof as shown in FIG. 1.

FIG. 19 is a side elevational view of the upper clamp member of the seat mounting assembly as seen along line 19—19 of FIG. 18.

DETAILED DESCRIPTION OF THE INVENTION

Figure 22:
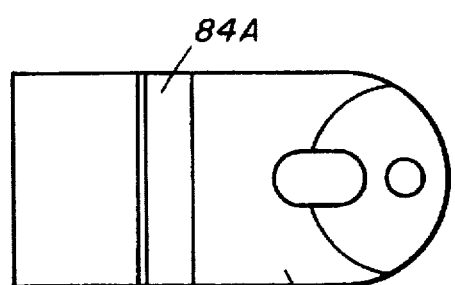
FIG. 22 is a top plan view of the base member of the seat mounting assembly as seen along line 22—22 of FIG. 21.

Referring to the drawings, and particularly to FIG. 1, there is illustrated a preferred embodiment of a shock transmission reducing suspension device, generally designated 10, of the present invention. The suspension device 10 basically includes an outer tube 12 adapted to be mounted to a frame of a bicycle (not shown), an inner shaft 14 adapted to support a bicycle seat (not shown) and a cyclist (not shown) seated thereon which both are intended to be isolated from shock impacts, a pair of lower and upper guide elements 16, 18 mounted within the outer tube 12 in a spaced apart axially aligned relationship with respect to one another, and shock absorbing means 20 disposed in the outer tube 12 below the lower guide element 16. The lower and upper guide elements 16, 18 receive and dispose the inner shaft 14 in a coaxial relationship with the outer tube 12 and guide the inner shaft 14 to undergo sliding movement axially along the outer tube 12 so as to extend from and retract into the outer tube 12 between respective extended and depressed positions. The shock absorbing means 20 supports the inner shaft 14 within the outer tube 12. Although it is yieldable to permit the inner shaft 14 to reactively move relative to the outer tube 12 toward the depressed position upon application of an axial shock on the outer tube 12, the shock absorbing means 20 normally biases the inner shaft 14 toward and holds the inner shaft 14 at the extended position relative to the outer tube 12.

Referring to FIGS. 1, 7 and 8, the outer tube 12 of the suspension device 10 is preferably elongated, hollow and rigid in its structural makeup, made Of a suitable material such as aluminum, and cylindrical in shape. The outer tube 12 has a pair of opposite open top and bottom ends 12A, 12B spaced apart from one another by the length of the outer tube 12. Referring to FIGS. 1, 11 and 12, an externally-threaded cylindrical bottom end cap 22 is removably secured in the internally-threaded open bottom end 12B of the outer tube 12 so as to to sealably close the bottom end 12B of the outer tube 12. The bottom end cap 22 has a pair of crossing grooves 24 formed in the bottom surface 22A of the end cap into which to place the bit end of a screwdriver in order to screw or unscrew the end cap 22 into or from the bottom end 12B of the outer tube 12.

Referring to FIGS. 1–6, the inner shaft 14 of the suspension device 10 is disposed within the outer tube 12 and extends upwardly through the open top end 12A thereof. The inner shaft 14 is preferably elongated, hollow and rigid in its structural makeup, made of a suitable material such as aluminum, and cylindrical in shape. The inner shaft 14 has an upper portion 14A, a lower portion 14B, and a middle portion 14C disposed between and rigidly interconnecting the upper and lower portions 14A, 14B. Preferably, the upper and lower portions 14A, 14B have hollow interiors whereas the middle portion 14C has a substantially solid interior which strengthens the inner shaft 14 to better withstand the stress imposed on it during use. The upper portion 14A is larger in cross-sectional size and different in cross-sectional shape than the lower portion 14B while they have similar axial lengths. Preferably, the upper portion 14A is circular in cross-section while the lower portion 14B is non-circular or polygonal in cross-section. The middle portion 14C which provides a transition between the different cross-sectionally shaped and sized upper and lower portions 14A, 14B is substantially shorter in axial length than either of the upper and lower portions 14A, 14B.

Referring to FIGS. 1 and 7–10, the lower guide element 16 of the suspension device 10 is annular in shape and preferably has a non-circular or polygonal-shaped central bore 26 defined therethrough. The lower guide element 16 is fixedly and stationarily secured in any suitable manner, such as by adhesively bonding, within the outer tube 12 substantially intermediately between and spaced from its open top end 12A and open bottom end 12B. The upper guide element 18 of the suspension device 10 also is annular in shape and preferably has a circular-shaped central opening 28 defined therethrough. The upper guide member 18 also is fixedly and stationarily secured in any suitable manner, such as by adhesively bonding, within the outer tube 12 adjacent to its open top end 12A. The upper guide element 18 is spaced above and axially aligned with the lower guide element 16 and also with the respective coincident longitudinal axes A of the outer tube 12 and inner shaft 14. In order to facilitate bonding of the lower guide element 16 at the intermediate location in the outer tube 12 which is spaced from both its top and bottom ends 12A, 12B, the lower guide element 16 has a hole 30 defined therein, being opening at a top surface 16A of the lower guide element 16 and offset from the central bore 26 therethrough, and a peripheral groove 32 formed about the circumference of the lower guide element. 16 which intersects with the bottom 30A of the hole 30. The hole 30 and groove 32 thus provide a pathway for filling the peripheral groove 32 with an adhesive substance 34, being delivered from an elongated nozzle (not) inserted into the outer tube 12 through its open top end 12A, after the lower guide element 16 is installed at the desired location in the outer tube 12. The adhesive substance 34 filling the peripheral groove 32 thus provides a continuous circumferential adhesive bond between the periphery of the lower guide element 16 and the inside surface 12D of the outer tube 12.

The upper portion 14A and lower portion 14B of the inner shaft 14 as described previously are thus sized and shaped cross-sectionally to respectively snugly slidably fit and be received through the central opening 28 of the upper guide element 18 and the central bore 26 of the lower guide element 18 such that the upper and lower guide elements 18, 16 in the outer tube 12 function to guide the inner shaft 14 in undergoing reciprocatory sliding movement along and relative to the outer tube 12 so that the upper portion 14A of the inner shaft 12 can extend from and retract into the open top end 12A of the outer tube 12 in moving correspondingly between the extended and depressed positions relative to the outer tube 12. The lower and upper guide elements 16, 18 preferably are substantially fabricated of a low friction or substantially friction-less material, such as Teflon or similiar materials, which minimizes the amount of friction generated in the suspension device 10 so as to enhance its reliability and operability over a prolonged useful life of use.

Also, as seen in FIG. 1, a stop element 36 is applied to a lower end 14D of the lower portion 14B of the inner shaft. 14 to retain the lower portion 14B extending through the central bore 26 of the lower guide element 16 upon the inner shaft 14 reaching the raised, extended position shown in FIG. 1. The stop element 36 includes a bolt 38 threaded into internal threads defined in the lower end 14D of the inner shaft 14. Also, the stop element 36 advantageously includes an annular washer 40 seated over the head 38A of the bolt 38 and a compressible O-ring 42 surrounding the lower end 14D of the inner shaft 14 and seated over the washer 40 for engaging a bottom surface 16B of the lower guide element 16 upon the inner shaft 14 reaching the extended position. The O-ring 42 compresses slightly upon impact with the bottom surface 16B of the lower guide element 15 to thereby cushion and dissipate any possible jolt created from the stopping of movement of the inner shaft 14 that could be felt by the cyclist riding on the bicycle and also over time that might tend to damage the adhesive bond between the lower guide element 16 and the outer tube 12.

Referring to FIGS. 1, 14 and 15, the shock absorbing means 20 of the suspension device 10 preferably is a plurality of elastomeric elements 44 in the form of substantially cylindrical bodies arranged in end-to-end stacked relationship and captured in the outer tube 12 between the top surface 22B of the bottom end cap 22 and and the lower end 14D of the inner shaft 14. The elastomeric elements 44 are preferably made of a resiliently compressible material, such as urethane or similar suitable materials, adapted to compress in axial length and expand in diameter, as shown in dashed line form in FIG. 1, and absorb a shock imparted thereto from the outer tube 12 via the bottom end cap 22 as a result of the shock being applied to the outer tube 12 such as by the bicycle frame. The compression of the elastomeric elements 44 and the absorption of the shock by them reduces transmission of the shock therethrough to the inner shaft 14 and therefrom to the bicycle seat supported thereon. The compression of the elastomeric elements 44 permits the inner shaft 14, which supports the bicycle seat and cyclist that are intended to be isolated from the shock, to slidably move downwardly relative to and through the lower and upper guide elements 16, 18 and farther into the outer tube 12 toward the depressed position, as represented approximately by the dashed line D in FIG. 1. The resiliency of the compressible material forming the elastomeric elements 44 adapts the elastomeric elements 44, upon cessation of application of the shock on the outer tube 12, to expand in axial length back to the original length, as shown in solid line form in FIG. 1, and thereby cause the inner shaft 14 to slidably move upwardly relative to the lower and upper guide elements 16, 18 and its upper portion 14A to extend back out of the open top end 12A of the outer tube 12 toward its normal extended position, as shown in solid line form in FIG. 1. In order to maintain the elastomeric elements 44 in their desired end-to-end stacked relationship as seen in FIG. 1, each elastomeric element 44 preferably has a protrusion 44A, such as conical convex in shape, formed at and projecting axially outwardly from one end of the element 44 and a depression 44B, such as conical concave in shape, countersunk or formed in an opposite end of the element 44. These protrusions 44A and depressions 44B cause the elastomeric elements 44 placed in the stacked relationship to mate with one another at their respective adjacent opposite ends and thus prevent the elastomeric elements 44 to become mislocation during the compression thereof.

Referring to FIGS. 1 and 13, the suspension device 10 further includes a flexible tubular protective cover sleeve 46 having a pair of axially spaced opposite upper and lower ends 48, 50 surrounding and sealably engaged with the respective upper end 14E of the inner shaft 14 and open top end 12A of the outer tube 12 and a cylindrical tubular sidewall 52 extending between the opposite upper and lower ends 48, 50 so as to prevent foreign matter from accumulating on the upper portion 14A of the inner shaft 14 extending from the open top end 12A of the outer tube 12. The cover sleeve 46 also includes an annular internal rib 54 formed at and about the interior of the upper end 48 of the cover sleeve 46 so as to protrude radially inwardly from the tubular sidewall 52 to mate within an annular groove 56 defined about an annular collar 57 attached about the upper end 14E of the inner shaft 14 to thereby provide an upper seal therewith. The cover sleeve 46 further includes an annular internal lip 58 formed at and about the interior of the lower end 50 of the cover sleeve 46 so as to protrude radially inwardly from the tubular sidewall 52 to engage with and surround the open top end 12A of the outer tube 12 to thereby provide a lower seal therewith.

The arrangement of the above-described components of the suspension device 10 advantageously provide multiple substantially sealed air chambers which assist or augment the shock absorbing means 20 in dampening or slowing the rate of retraction of the inner shaft 14 into the outer tube 12 and thus increase the comfort of the cyclist using the suspension device 10. First, the outer tube 12 and the inner shaft 14 together with the flexible cover sleeve 46 form an external annular chamber 60 that contains a gas, such as ordinary air, therein. The gas becomes compressed upon movement of the inner shaft 14 from its extended position to depressed position into the outer tube 12 so as to dampen and reduce the rate of such movement of the inner shaft. The compression of the gas occurs substantially as the facing surfaces of the annular collar 57 and top end 12A of the outer tube 12 together with the top edge of the upper guide element 18 approach toward one another. Second, the upper portion 14A of the inner shaft 14 has an outside surface spaced radially inwardly from an inside surface of the outer tube 12 so as to define an upper internal annular chamber 62 therebetween which extends between the facing surfaces of the upper and lower guide elements 16, 18 and also contains a gas, such as ordinary air, therein. The upper portion 14A of the inner shaft 14 occupies a greater volume than does the lower portion 14B thereof so that the volume of the upper internal annular chamber 62 within the outer tube 12 is reduced by retraction of the upper portion 14A of the inner shaft 14 into the outer tube 12. Such reduction in the volume therein causes compression of the gas contained in the upper internal annular chamber 62 providing an dampening that reduces the rate of retraction of the inner shaft 14 into the outer tube 12 and thereby augments the absorption of shock by the stack of elastomeric elements 44. Third, the resiliently compressible elastomeric elements 44 have outside surfaces which in the uncompressed states of the elements are spaced inwardly from the inside surface of the outer tube 12 so as to define a lower internal annular chamber 64 therebetween which extends axially between the facing surfaces of the lower guide element 16 and the bottom end cap 22 and also contains a gas, such as ordinary air, therein. The lower internal annular chamber 64 permits circumferantial expansion of the elastomeric elements 44 upon compression thereof when the inner shaft 14 is retracted to the depressed position within the outer tube 12. The lower portion 14B of the inner shaft 14 in the depressed position along with the elastomeric elements 44 in the compressed state occupy a greater volume than does the elastomeric elements 44 alone in the uncompressed state so that the volume of the lower internal annular chamber 64 within the outer tube 12 is reduced by retraction of the lower portion 14B of the inner shaft 14 farther into the outer tube 12 below the lower annular guide 16 therein. Such reduction in the volume therein causes compression of the gas contained in the lower internal annular chamber 64 providing an additional dampening that reduces the rate of retraction of the inner shaft 14 into the outer tube 12 and thereby augments the absorption of shock by the stack of elastomeric elements 44.

Referring to FIGS. 1, 2 and 16–19, the suspension device 10 also includes a bicycle seat mounting assembly 66 which includes a base member 68 rigidly attached to the upper end 14E of the inner shaft 14 and a pair of lower and upper clamp members 70, 72 adapted to be releasably fastened upon the base member 68 by an elongated fastener 74 which extends vertically through the base member 68 and lower clamp member 70 and is threaded into the upper clamp member 72. The lower and upper clamp members 70, 72 have matching pairs of channels 76, 78 recessed in the facing surfaces 70A, 72A of the lower and upper clamp members 70, 72 along the opposite side edge portions thereof. The channels 76, 78 receive a pair of support rails R of a bicycle seat therebetween to which the lower and upper clamp members 70, 72 are clamped upon tightened of the fastener 74.

Figure 21:
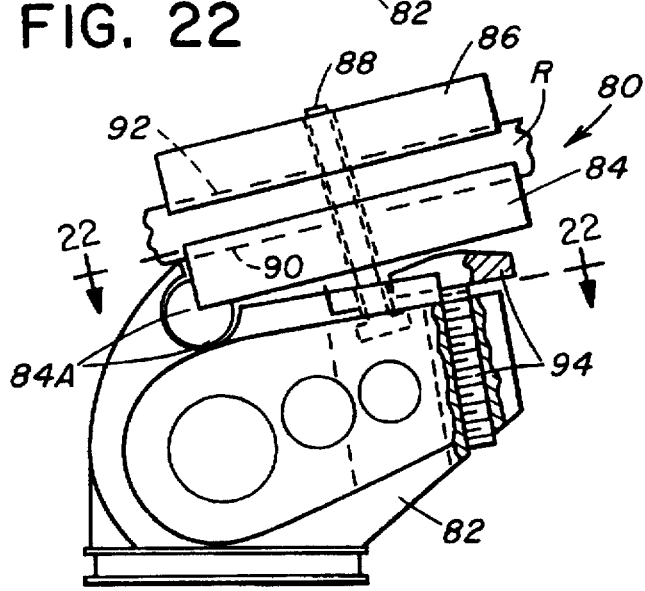
FIG. 21 is an enlarged side elevational view of the second embodiment of the seat mounting assembly showing a pivotal lower clamp member displaced upwardly from a base member of the seat mounting assembly.
Figure 20:
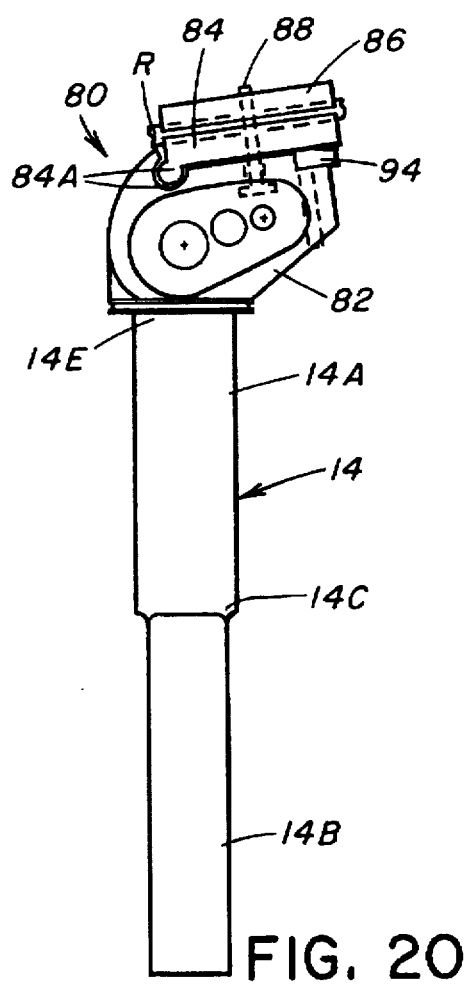
FIG. 20 is another side elevational view of the inner tube of the suspension device similar to that of FIG. 2 except now showing a second embodiment of the seat mounting assembly on the upper end of the inner tube.
Figure 23:
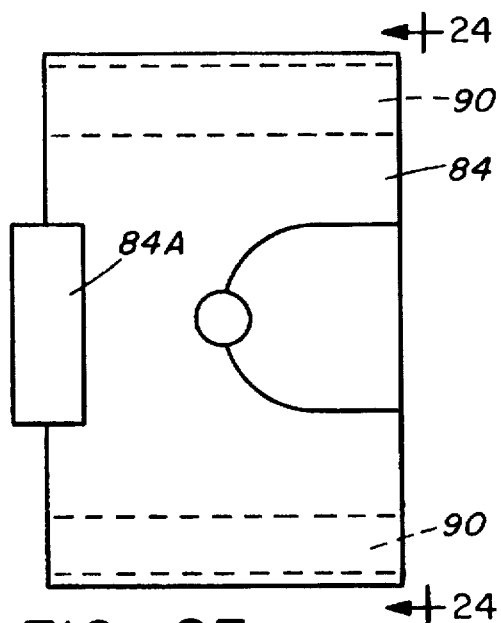
FIG. 23 is a bottom plan view of the lower clamp member of the second embodiment of the seat mounting assembly.
Figure 24:
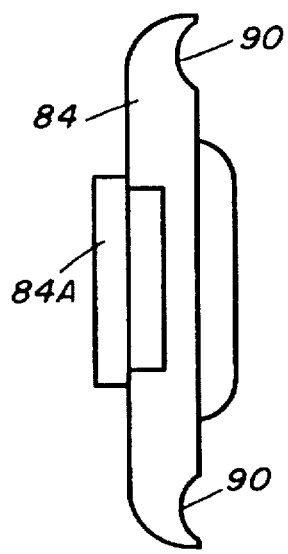
FIG. 24 is an end elevational view of the lower clamp member of the second embodiment of the seat mounting assembly as seen along line 24—24 of FIG. 23.

Referring to FIGS. 20–24, there is illustrated an improved alternative embodiment of a seat mounting assembly 80. The improved mounting assembly 80 also includes a base member 82 and a pair of lower and upper clamp members 84, 86. The base member 82 is fixedly supported on the upper end 14E of the inner shaft 14 and spaced above the top end 12A of the outer tube 12. Now, the lower clamp member 84 is pivotally hinged at one end 84A to the base member 82. The upper clamp member 86 and fastener 88 are substantially the same as in the previous embodiment and both the lower and upper clamp members 84, 86 have pairs of channels 90, 92 thereon, as before, which are adapted to receive and clamp the pair of support rails R of the bicycle seat therebetween, as before, upon tightening of the fastener 88. The improved seat mounting assembly 80 also includes an adjustment member 94 in the form of a thumbscrew 94 threadably mounted to the base member 82 and rotatable relative thereto to engage and cause the lower clamp member 84 to pivotally move toward and away from the base member 82 to change the angular orientation of the bicycle seat. In both the previous and improved assemblies 66, 80, the support rails and thus the seat therewith can be adjustably moved in a fore and aft direction relative to the upper and lower clamp members to thereby adjust the location of the seat relative to the seat mounting assembly 66, 80. However, only in the improved assembly 80 is the thumbscrew 94 present to adjustably position and hold the pivotal lower clamp member 84 in a desired angular relationship to the base member 82 and thereby the bicycle seat at a desired angular position on the inner shaft 14.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A suspension device for reducing shock transmission through bicycle components, said device comprising:
   (a) an elongated outer tube having an open top end and a bottom end spaced apart from one another;
   (b) a lower guide element having a bore defined therethrough and being stationarily secured within said outer tube between and spaced from said top and bottom ends thereof;
   (c) an upper guide element having an opening defined therethrough and being stationarily secured within said outer tube near said open top end of said outer tube and spaced from and axially aligned with said lower guide element;
   (d) an elongated inner shaft disposed within said outer tube and extending upwardly through said open top end thereof, said inner shaft having an upper portion received through said opening of said upper guide element and a lower portion received through said bore of said lower guide element so as to guide said inner shaft to undergo reciprocatory sliding movement relative thereto and axially of said outer tube and thereby extend from and retract into said open top end of said outer tube correspondingly between extended and depressed positions relative to said outer tube; and
   (e) shock absorbing means disposed in said outer tube for supporting and biasing said inner shaft to undergo sliding movement toward said extended position and for yielding in response to receiving a shock impact to permit said inner shaft to undergo sliding movement toward said depressed position;
   (f) wherein said opening of said upper guide element has a circular cross-sectional shape;
   (g) wherein said bore of said lower guide element has a polygonal cross-sectional shape.

2. The device of claim 1 wherein said lower portion of said inner shaft is of a polygonal cross-sectional shape and of a size adapting said lower portion to snugly slidably fit through said polygonal shaped opening of said lower guide element.

3. The device of claim 1 wherein said upper portion of said inner shaft is of a circular cross-sectional shape and of a size adapting said upper portion to snugly slidably fit through said circular shaped opening of said upper guide element.

4. The device of claim 1 wherein:
   said upper portion of said inner shaft is of a circular cross-sectional shape and of a size adapting said upper portion to snugly slidably fit through said circular shaped opening of said upper guide element; and
   said lower portion of said inner shaft is of a polygonal cross-sectional shape and of a size adapting said lower portion to snugly slidably fit through said polygonal shaped bore of said lower guide element such that said inner shaft is longitudinally movable along coincident longitudinal axes of said inner shaft and said outer tube but not rotatably movable about said axes relative to said outer tube.

5. The device of claim 1 wherein said inner shaft includes a middle portion disposed between and rigidly interconnecting said upper and lower portions, said middle portion having a substantially solid interior, said upper and lower portions each having a hollow interior.

6. The device of claim 1 wherein said upper and lower guide elements are fabricated of a substantially frictionless material.

7. The device of claim 1 further comprising:
   (h) a flexible tubular protective cover sleeve having spaced apart upper and lower ends respectively surrounding and engaged with spaced top end of said outer tube and said upper portion of said inner shaft and extending therebetween so as to prevent foreign matter from accumulating on said upper portion of said inner shaft extending from said upper end of said outer tube.

8. The device of claim 1 further comprising:
   (h) a seat mounting assembly including a base member fixedly supported on an upper end of said upper portion of said inner shaft and spaced above said top end of said outer tube and clamping means for receiving and holding a pair of support rails of the bicycle seat, said clamping means having a lower member pivotally hinged at one end to said base member for movement of said clamping means arcuately toward and away from said base member so as to change the angular orientation of the bicycle seat, said clamping means also having an upper member releasably attachable to said lower member to clamp the seat support rails therebetween and also to permit moving of the support rails and thus the seat therewith in a fore and aft direction relative to said lower member to a new location and then clamping of said upper member at the new location in order to change the fore-and-aft location of the bicycle seat relative to said seat mounting assembly.

9. The device of claim 8 wherein said seat mounting assembly also includes an adjustment member mounted to said base member and rotatable relative thereto to engage and pivotally move said lower member of said clamping means toward and away from said base member to change said lower member to and hold said lower member and thereby the bicycle seat clamped thereto at a new angular orientation relative to said base member of said seat mounting assembly.

10. A suspension device for reducing shock transmission through bicycle components, said device comprising:
   (a) an elongated outer tube having an open top end and a bottom end spaced apart from one another;
   (b) a lower guide element having a bore defined therethrough and being stationarily secured within said outer tube between and spaced from said top and bottom ends thereof;
   (c) an upper guide element having an opening defined therethrough and being stationarily secured within said outer tube near said open top end of said outer tube and spaced from and axially aligned with said lower guide element;
   (d) an elongated inner shaft disposed within said outer tube and extending upwardly through said open top end thereof, said inner shaft having an upper portion received through said opening of said upper guide element and a lower portion received through said bore of said lower guide element so as to guide said inner shaft to undergo reciprocatory sliding movement relative thereto and axially of said outer tube and thereby extend from and retract into said open top end of said outer tube correspondingly between extended and depressed positions relative to said outer tube;

(e) shock absorbing means disposed in said outer tube for supporting and biasing said inner shaft to undergo sliding movement toward said extended position and for yielding in response to receiving a shock impact to permit said inner shaft to undergo sliding movement toward said depressed position; and (f) a flexible tubular protective cover sleeve having spaced apart upper and lower ends respectively surrounding and engaged with spaced top end of said outer tube and said upper portion of said inner shaft and extending therebetween so as to prevent foreign matter from accumulating on said upper portion of said inner shaft extending from said upper end of said outer tube;

(g) wherein said cover sleeve has a tubular sidewall extending between said upper and lower ends thereof, an annular internal rib formed at said upper end of said cover sleeve so as to protrude radially inwardly from said tubular sidewall for mating within an annular groove defined about an upper end of said upper portion of said inner shaft to provide an upper seal therewith, and an annular internal lip formed at said lower end of said cover sleeve so as to protrude radially inwardly from said tubular sidewall for engaging about said top end of said outer tube to provide a lower seal therewith.

11. A suspension device for reducing shock transmission through bicycle components, said device comprising:

(a) an elongated outer tube having an open top end and a bottom end spaced apart from one another;

(b) a lower guide element having a bore defined therethrough and being stationarily secured within said outer tube between and spaced from said top and bottom ends thereof;

(c) an upper guide element having an opening defined therethrough and being stationarily secured within said outer tube near said open top end of said outer tube and spaced from and axially aligned with said lower guide element;

(d) an elongated inner shaft disposed within said outer tube and extending upwardly through said open top end thereof, said inner shaft having an upper portion received through said opening of said upper guide element and a lower portion received through said bore of said lower guide element so as to guide said inner shaft to undergo reciprocatory sliding movement relative thereto and axially of said outer tube and thereby extend from and retract into said open top end of said outer tube correspondingly between extended and depressed positions relative to said outer tube;

(e) a support element disposed within said outer tube near said bottom end thereof and below said inner shaft and said lower guide element; and (f) shock absorbing means disposed in said outer tube for supporting and biasing said inner shaft to undergo sliding movement toward said extended position and for yielding in response to receiving a shock impact to permit said inner shaft to undergo sliding movement toward said depressed position, wherein said shock absorbing means is a plurality of elastomeric elements arranged in an end-to-end stacked relationship and being supported below said inner shaft by said support element, said plurality of elastomeric elements being disposed and extending between said support element and a lower end of said inner shaft such that said elastomeric elements in said end-to-end stacked relationship support said inner shaft at said lower end thereof.

12. The device of claim 11 wherein each of said elastomeric elements is made of a resilient compressible material adapted to compress in axial length and absorb a shock imparted thereto and thereby reduce transmission of the shock therethrough to said inner shaft, the resiliency of said compressible material upon cessation of application of the shock causing said elastomeric element to expand back in axial length.

13. The device of claim 11 wherein each of said elastomeric elements has a protrusion formed at one end and a depression formed at an opposite end so as to cause said elastomeric elements to mate with one another in said end-to-end stacked relationship.

14. The device of claim 11 wherein said support element is a bottom end cap removably secured in said bottom end of said outer tube so as to sealably close said bottom end and support a lower end of said stacked elastomeric elements.

15. A suspension device for reducing shock transmission through bicycle components, said device comprising:

(a) an elongated outer tube having an open top end and a bottom end spaced apart from one another;

(b) a lower guide element having a bore defined therethrough and being stationarily secured within said outer tube between and spaced from said top and bottom ends thereof;

(c) an upper guide element having an opening defined therethrough and being stationarily secured within said outer tube near said open top end of said outer tube and spaced from and axially aligned with said lower guide element;

(d) an elongated inner shaft disposed within said outer tube and extending upwardly through said open top end thereof, said inner shaft having an upper portion received through said opening of said upper guide element and a lower portion received through said bore of said lower guide element so as to guide said inner shaft to undergo reciprocatory sliding movement relative thereto and axially of said outer tube and thereby extend from and retract into said open top end of said outer tube correspondingly between extended and depressed positions relative to said outer tube;

(e) shock absorbing means disposed in said outer tube for supporting and biasing said inner shaft to undergo sliding movement toward said extended position and for yielding in response to receiving a shock impact to permit said inner shaft to undergo sliding movement toward said depressed position; and (f) a flexible tubular protective cover sleeve having spaced apart upper and lower ends respectively surrounding and sealably engaged with spaced top end of said outer tube and said upper portion of said inner shaft and extending therebetween to form an external annular chamber containing a gas therein which becomes compressed upon movement of said inner shaft from said extended position to said depressed position into said outer tube and thereby dampens and reduces the rate of said movement of said inner shaft.

16. A suspension device for reducing shock transmission through bicycle components, said device comprising:
- (a) an elongated outer tube having an open top end and a bottom end spaced apart from one another;
- (b) a lower guide element having a bore defined therethrough and being stationarily secured within said outer tube between and spaced from said top and bottom ends thereof;
- (c) an upper guide element having an opening defined therethrough and being stationarily secured within said outer tube near said open top end of said outer tube and spaced from and axially aligned with said lower guide element;
- (d) an elongated inner shaft disposed within said outer tube and extending upwardly through said open top end thereof, said inner shaft having an upper portion received through said opening of said upper guide element and a lower portion received through said bore of said lower guide element so as to guide said inner shaft to undergo reciprocatory sliding movement relative thereto and axially of said outer tube and thereby extend from and retract into said open top end of said outer tube correspondingly between extended and depressed positions relative to said outer tube; and
- (e) shock absorbing means disposed in said outer tube for supporting and biasing said inner shaft to undergo sliding movement toward said extended position and for yielding in response to receiving a shock impact to permit said inner shaft to undergo sliding movement toward said depressed position;
- (f) wherein said lower guide element has an axial hole defined therein offset from the central opening and a peripheral groove defined about the circumference of the lower annular guide element which intersects with the axial hole, said hole and groove providing a pathway for filling the peripheral groove with an adhesive substance after the lower annular guide element is installed at the desired location in the outer tube so as to provide a continuous circumferential bond between the periphery of the lower annular guide element and the inside surface of the outer tube.

17. A suspension device for reducing shock transmission through bicycle components, said device comprising:
- (a) an elongated outer tube having an open top end and a bottom end spaced apart from one another;
- (b) a lower annular guide element stationarily secured within said outer tube between and spaced from said top and bottom ends thereof;
- (c) an upper annular guide element stationarily secured within said outer tube near said open top end of said outer tube and spaced from and axially aligned with said lower guide element;
- (d) an elongated inner shaft disposed within said outer tube and extending upwardly through said open top end thereof and through said lower and upper annular guide elements such that said lower and upper annular guide elements guide said inner shaft to undergo reciprocatory sliding movement relative thereto axially along said outer tube and thereby extend from and retract into said open top end of said outer tube correspondingly between extended and depressed positions relative to said outer tube;
- (e) a support element disposed within said outer tube near said bottom end thereof and below said inner shaft and said lower annular guide element; and
- (f) shock absorbing means disposed in said outer tube for supporting and biasing said inner shaft to undergo sliding movement toward said extended position and for yielding in response to receiving a shock impact to permit said inner shaft to undergo sliding movement toward said depressed position, said shock absorbing means including a plurality of elastomeric elements arranged in an end-to-end stacked relationship and being supported below said inner shaft by said support element, said plurality of elastomeric elements being disposed and extending between said support element and a lower end of said inner shaft such that said elastomeric elements in said end-to-end stacked relationship support said inner shaft at said lower end thereof, each of said elastomeric elements being made of a resilient compressible material adapted to expand in circumference and compress in axial length and thereby absorb the shock imparted thereto and thereby reduce transmission of the shock therethrough to said inner shaft, the resiliency of said compressible material upon cessation of application of the shock causing said elastomeric element to expand back in axial length.

18. The device of claim 17 wherein each of said elastomeric elements has a protrusion formed at one end thereof and a depression formed at an opposite end thereof so as to cause said elastomeric elements to mate with one another when in said end-to-end stacked relationship.

19. The device of claim 18 wherein each of said elastomeric elements is cylindrical in shape and each of said protrusion and depression is conical in shape.

20. The device of claim 17 wherein said support element is a bottom end cap removably secured in said bottom end of said outer tube so as to sealably close said bottom end and support a lower end of said stacked elastomeric elements.

21. The device of claim 17 further comprising:
- (g) a flexible tubular protective cover sleeve having spaced apart upper and lower ends respectively surrounding and engaged with spaced top end of said outer tube and said upper portion of said inner shaft and extending therebetween so as to prevent foreign matter from accumulating on said upper portion of said inner shaft extending from said upper end of said outer tube.

22. A suspension device for reducing shock transmission through bicycle components, said device comprising:
- (a) an elongated outer tube having an open top end and a bottom end spaced apart from one another;
- (b) a lower annular guide element stationarily secured within said outer tube between and spaced from said top and bottom ends thereof;
- (c) an upper annular guide element stationarily secured within said outer tube near said open top end of said outer tube and spaced from and axially aligned with said lower guide element;
- (d) an elongated inner shaft disposed within said outer tube and extending upwardly through said open top end thereof and through said lower and upper annular guide elements such that said lower and upper annular guide elements guide said inner shaft to undergo reciprocatory sliding movement relative thereto axially along said outer tube and thereby extend from and retract into said open top end of said outer tube correspondingly between extended and depressed positions relative to said outer tube;
- (e) shock absorbing means disposed in said outer tube for supporting and biasing said inner shaft to undergo sliding movement toward said extended position and for yielding in response to receiving a shock impact to permit said inner shaft to undergo sliding movement toward said depressed position, said shock absorbing means including a plurality of elastomeric elements arranged in an end-to-end stacked relationship and disposed in said outer tube extending between said bottom end of said outer tube and a lower end of said inner shaft, each of said elastomeric elements being made of a resilient compressible material adapted to expand in circumference and compress in axial length and thereby absorb the shock imparted thereto and thereby reduce transmission of the shock therethrough to said inner shaft, the resiliency of said compressible material upon cessation of application of the shock causing said elastomeric element to expand back in axial length; and (f) a flexible tubular protective cover sleeve having spaced apart upper and lower ends respectively surrounding and engaged with spaced top end of said outer tube and said upper portion of said inner shaft and extending therebetween so as to prevent foreign matter from accumulating on said upper portion of said inner shaft extending from said upper end of said outer tube;

(g) wherein said cover sleeve has a tubular sidewall extending between said upper and lower ends thereof, an annular internal rib formed at said upper end of said cover sleeve so as to protrude radially inwardly from said tubular sidewall for mating within an annular groove defined about an upper end of said upper portion of said inner shaft to provide an upper seal therewith, and an annular internal lip formed at said lower end of said cover sleeve so as to protrude radially inwardly from said tubular sidewall for engaging about said top end of said outer tube to provide a lower seal therewith.

23. A suspension device for reducing shock transmission through bicycle components, said device comprising:

(a) an elongated outer tube having an open top end and a bottom end spaced apart from one another;

(b) a lower annular guide element stationarily secured within said outer tube between and spaced from said top and bottom ends thereof;

(c) an upper annular guide element stationarily secured within said outer tube near said open top end of said outer tube and spaced from and axially aligned with said lower guide element;

(d) an elongated inner shaft disposed within said outer tube and extending upwardly through said open top end thereof and through said lower and upper annular guide elements such that said lower and upper annular guide elements guide said inner shaft to undergo reciprocatory sliding movement relative thereto axially along said outer tube and thereby extend from and retract into said open top end of said outer tube correspondingly between extended and depressed positions relative to said outer tube;

(e) shock absorbing means disposed in said outer tube for supporting and biasing said inner shaft to undergo sliding movement toward said extended position and for yielding in response to receiving a shock impact to permit said inner shaft to undergo sliding movement toward said depressed position, said shock absorbing means including a plurality of elastomeric elements arranged in an end-to-end stacked relationship and disposed in said outer tube extending between said bottom end of said outer tube and a lower end of said inner shaft, each of said elastomeric elements being made of a resilient compressible material adapted to expand in circumference and compress in axial length and thereby absorb the shock imparted thereto and thereby reduce transmission of the shock therethrough to said inner shaft, the resiliency of said compressible material upon cessation of application of the shock causing said elastomeric element to expand back in axial length; and (f) a flexible tubular protective cover sleeve having spaced apart upper and lower ends respectively surrounding and sealably engaged with spaced top end of said outer tube and said upper portion of said inner shaft and extending therebetween to form an external annular chamber containing a gas therein which becomes compressed upon movement of said inner shaft from said extended position to said depressed position into said outer tube and thereby dampens and reduces the rate of said movement of said inner shaft.

24. A suspension device for reducing shock transmission through bicycle components, said device comprising:

(a) an elongated outer tube having an open top end and a bottom end spaced apart from one another;

(b) a lower annular guide element stationarily secured within said outer tube between and spaced from said top and bottom ends thereof;

(c) an upper annular guide element stationarily secured within said outer tube near said open top end of said outer tube and spaced from and axially aligned with said lower guide element;

(d) an elongated inner shaft disposed within said outer tube and extending upwardly through said open top end thereof and through said lower and upper annular guide elements such that said lower and upper annular guide elements guide said inner shaft to undergo reciprocatory sliding movement relative thereto axially along said outer tube and thereby extend from and retract into said open top end of said outer tube correspondingly between extended and depressed positions relative to said outer tube; and (e) shock absorbing means disposed in said outer tube for supporting and biasing said inner shaft to undergo sliding movement toward said extended position and for yielding in response to receiving a shock impact to permit said inner shaft to undergo sliding movement toward said depressed position, said shock absorbing means including a plurality of elastomeric elements arranged in an end-to-end stacked relationship and disposed in said outer tube extending between said bottom end of said outer tube and a lower end of said inner shaft, each of said elastomeric elements being made of a resilient compressible material adapted to expand in circumference and compress in axial length and thereby absorb the shock imparted thereto and thereby reduce transmission of the shock therethrough to said inner shaft, the resiliency of said compressible material upon cessation of application of the shock causing said elastomeric element to expand back in axial length;

(f) wherein said lower guide element has an axial hole defined therein offset from the central opening and a peripheral groove defined about the circumference of the lower annular guide element which intersects with the axial hole, said hole and groove providing a pathway for filling the peripheral groove with an adhesive substance after the lower annular guide element is installed at the desired location in the outer tube so as to provide a continuous circumferential bond between the periphery of the lower annular guide element and the inside surface of the outer tube.

25. A suspension device for reducing shock transmission through bicycle components, said device comprising:

(a) an elongated outer tube having an open top end and a bottom end spaced apart from one another;

(b) a lower guide element having a bore defined therethrough and being stationarily secured within said outer tube between and spaced from said top and bottom ends thereof;

(c) an upper guide element having an opening defined therethrough and being stationarily secured within said outer tube near said open top end of said outer tube and spaced from and axially aligned with said lower guide element;

(d) an elongated inner shaft disposed within said outer tube and extending upwardly through said open top end thereof, said inner shaft having an upper portion snugly slidably received through said opening of said upper guide element and a lower portion snugly slidably received through said bore of said lower guide element so as to guide said inner shaft in undergoing reciprocatory sliding movement relative thereto axially along said outer tube and thereby extend from and retract into said open top end of said outer tube correspondingly between extended and depressed positions relative to said outer tube; and (e) shock absorbing means disposed in said outer tube for supporting and biasing said inner shaft to undergo sliding movement toward said extended position and for yielding in response to receiving a shock impact to permit said inner shaft to undergo sliding movement toward said depressed position;

(f) said inner shaft having an outside surface spaced radially inwardly from an inside surface of said outer tube so as to define an upper internal annular chamber therebetween extending between said upper and lower guide elements and containing a gas therein, said upper portion of said inner shaft occupying a greater volume than said lower portion thereof such that said volume of said upper annular chamber within said outer tube is reduced by retraction of said upper portion of said inner shaft into said outer tube which causes compression of the gas contained in said upper internal annular chamber and thereby provides a damping effect that reduces the rate of retraction of said inner shaft into said outer tube and thereby augments the absorption of shock by said shock absorbing means.

26. The device of claim 25 further comprising:

(g) a flexible tubular protective cover sleeve having spaced apart upper and lower ends respectively surrounding and sealably engaged with spaced top end of said outer tube and said upper portion of said inner shaft and extending therebetween to form an external annular chamber containing a gas therein which becomes compressed upon movement of said inner shaft from said extended position to said depressed position into said outer tube and thereby dampens and reduces the rate of said movement of said inner shaft and thereby augments the absorption of shock by said shock absorbing means.

27. A suspension device for reducing shock transmission through bicycle components, said device comprising:

(a) an elongated outer tube having an open top end and an open bottom end spaced apart from one another;

(b) a lower guide element having a bore defined therethrough and being stationarily secured within said outer tube between and spaced from said top and bottom ends thereof;

(c) an upper guide element having an opening defined therethrough and being stationarily secured within said outer tube near said open top end of said outer tube and spaced from and axially aligned with said lower guide element;

(d) an elongated inner shaft disposed within said outer tube and extending upwardly through said open top end thereof, said inner shaft having an upper portion snugly slidably received through said opening of said upper guide element and a lower portion snugly slidably received through said bore of said lower guide element so as to guide said inner shaft in undergoing reciprocatory sliding movement relative thereto axially along said outer tube and thereby extend from and retract into said open top end of said outer tube correspondingly between extended and depressed positions relative to said outer tube;

(e) shock absorbing means disposed in said outer tube for supporting and biasing said inner shaft to undergo sliding movement toward said extended position and for yielding in response to receiving a shock impact to permit said inner shaft to undergo sliding movement toward said depressed position, said shock absorbing means being a plurality of elastomeric elements arranged in an end-to-end stacked relationship and disposed within the outer tube, said elastomeric elements when in uncompressed states having outside surfaces spaced inwardly from an inside surface of said outer tube so as to permit said elastomeric elements to circumferentially expand upon compression thereof when said inner shaft is retracted from said extended position to said depressed position relative to and within said outer tube, said elastomeric elements being made of a resiliently compressible material adapted to compress in axial length and absorb a shock imparted thereto permitting said inner shaft which supports a load intended to be isolated from the shock to slidably move further into said outer tube toward a depressed position, said resiliency of said compressible material forming the elastomeric elements adapting said elastomeric elements upon cessation of application of the shock thereon to expand back in axial length and thereby cause said inner shaft to slidably move and said upper portion thereof to extend out of said outer tube toward said extended position; and (f) a bottom end cap removably secured in said bottom end of said outer tube so as to sealably close said bottom end and support said elastomeric elements in said end-to-end stacked relationship;

(g) said outside surfaces of said elastomeric elements in being spaced inwardly from said inside surface of said outer tube defining a lower internal annular chamber therebetween which extends axially between said lower guide element and said lower end cap and contains a gas such that said lower internal annular chamber permits circumferantial expansion of said elastomeric elements upon compression thereof when said inner shaft is retracted to the depressed position within said outer tube, said lower portion of said inner shaft in the depressed position along with said elastomeric elements in the compressed state occupying a greater volume than said elastomeric elements alone in the uncompressed state so that the volume of said lower internal annular chamber within said outer tube is reduced by retraction of said lower portion of said inner shaft further into said outer tube below said lower guide element therein which causes compression of the gas contained in said lower internal annular chamber and thereby providing additional damping effect that slows the rate of retraction of said inner shaft into said outer tube and thereby further augments the absorption of shock by said stacked elastomeric elements.

28. The device of claim 27 wherein each of said elastomeric elements has a protrusion formed at one end and a depression formed at an opposite end so as to cause said elastomeric elements to mate with one another in said end-to-end stacked relationship.

29. A suspension device for reducing shock transmission through bicycle components, said device comprising:

(a) an elongated outer tube having an open top end and a bottom end spaced apart from one another;

(b) a lower annular guide element stationarily secured within said outer tube between and spaced from said top and bottom ends thereof;

(c) an upper annular guide element stationarily secured within said outer tube near said open top end of said outer tube and spaced from and axially aligned with said lower guide element;

(d) an elongated inner shaft disposed within said outer tube and extending upwardly through said open top end thereof and through said lower and upper annular guide elements such that said lower and upper annular guide elements guide said inner shaft to undergo reciprocatory sliding movement relative thereto axially along said outer tube and thereby extend from and retract into said open top end of said outer tube correspondingly between extended and depressed positions relative to said outer tube; and (e) shock absorbing means disposed in said outer tube for supporting and biasing said inner shaft to undergo sliding movement toward said extended position and for yielding in response to receiving a shock impact to permit said inner shaft to undergo sliding movement toward said depressed position, said shock absorbing means including a plurality of elastomeric elements arranged in an end-to-end stacked relationship and disposed in said outer tube extending between said bottom end of said outer tube and a lower end of said inner shaft, each of said elastomeric elements being made of a resilient compressible material adapted to expand in circumference and compress in axial length and thereby absorb the shock imparted thereto and thereby reduce transmission of the shock therethrough to said inner shaft, the resiliency of said compressible material upon cessation of application of the shock causing said elastomeric element to expand back in axial length;

(f) wherein each of said elastomeric elements has a protrusion formed at one end thereof and a depression formed at an opposite end thereof so as to cause said elastomeric elements to mate with one another when in said end-to-end stacked relationship.

30. The device of claim 29 wherein each of said elastomeric elements is cylindrical in shape and each of said protrusion and depression is conical in shape.

* * * * *